United States Patent [19]

Burris et al.

[11] 4,430,801

[45] Feb. 14, 1984

[54] APPARATUS FOR MEASURING A BELT CONSTRUCTION AND METHODS

[75] Inventors: Lee R. Burris, Porter Township, Christian County; James D. Hill, Jr., Turnback Township, Lawerence County, both of Mo.

[73] Assignee: Dayco Corporation, Dayton, Ohio

[21] Appl. No.: 362,212

[22] Filed: Mar. 26, 1982

[51] Int. Cl.³ .............................. G01B 3/56; G01B 5/24
[52] U.S. Cl. .................................. 33/174 E; 33/148 E
[58] Field of Search ............ 33/174 E, 174 R, 174 P, 33/148 R, 148 E, 403

[56] References Cited

U.S. PATENT DOCUMENTS

| 2,702,430 | 2/1955 | Bohnet | 33/403 |
| 2,874,475 | 2/1959 | McGaffey | 33/174 E X |
| 3,240,465 | 3/1966 | Henderson | 249/136 |

FOREIGN PATENT DOCUMENTS 712513 7/1954 United Kingdom ............ 33/174 E

Primary Examiner—Harry N. Haroian
Attorney, Agent, or Firm—Joseph V. Tassone

[57] ABSTRACT

An apparatus and method for measuring the angle of at least one side surface of an endless power transmission belt construction of a V-belt type is provided, the apparatus having a first part against which the belt construction is adapted to be disposed in a belt construction measuring position thereof and having a second part pivotally mounted to pivot on an axis thereof and being adapted to be pivotally disposed against the one side surface to indicate the angle thereof by the relation of its pivoted position relative to a reference when the belt construction is against the first part in the measuring position thereof, the apparatus having a moving device operatively interconnected to the second part to tend to move the same toward the belt construction in a direction substantially transverse to the axis thereof when the belt construction is in the measuring position thereof. A method of making such an apparatus is also provided.

31 Claims, 9 Drawing Figures

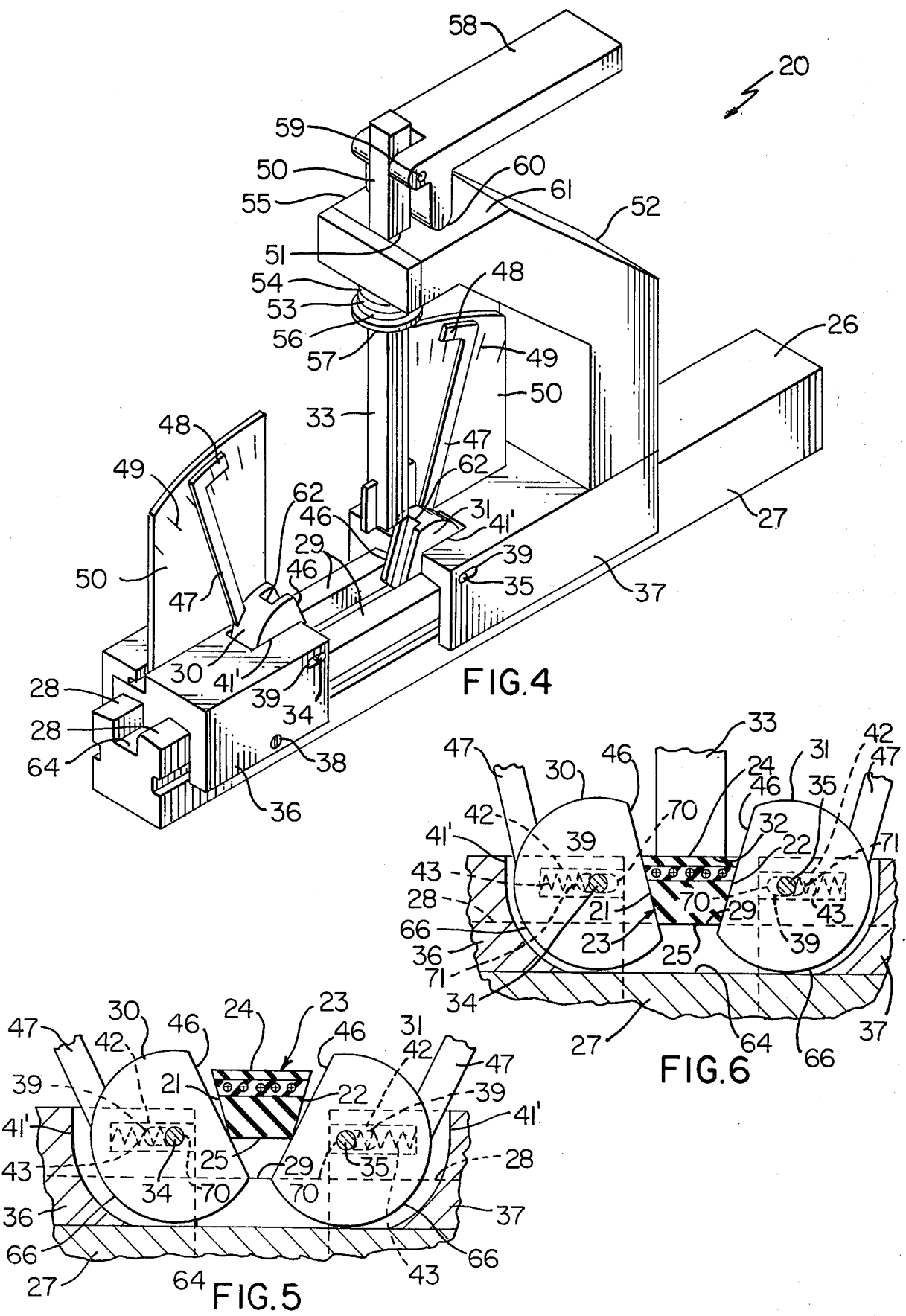

APPARATUS FOR MEASURING A BELT CONSTRUCTION AND METHODS

BACKGROUND OF THE INVENTION

1. Field of the Invention

This invention relates to an improved apparatus and method for measuring the angle of at least one side surface of an endless power transmission belt construction of the V-belt type as well as to the method of making such an apparatus or the like.

2. Prior Art Statement

It is known in the art to provide an apparatus and method for measuring the angle of at least one side surface of an endless power transmission belt construction of the V-belt type wherein the belt construction has a top surface and a bottom surface with a pair of opposed non-parallel side surfaces therebetween, the apparatus having a first part against which the belt construction is adapted to be disposed in a belt construction measuring position thereof and having a second part pivotally mounted to pivot on an axis thereof and being adapted to be pivotally disposed against the one side surface to indicate the angle thereof by the relation of its pivoted position relative to a reference means when the belt construction is against the first part in the measuring position thereof.

The first part of such prior known protractor-type apparatus has a straight surface against which the top of the belt construction is disposed and has a depending arcuate portion provided with a scale thereon and over which the second part moves to indicate the angle of the side wall of the belt construction, the second part being pivotally mounted to the first part and having one end thereof extending from the pivot point beyond the straight edge to engage against the side surface of the belt construction and having the other end thereof extending from the pivot point to the scale.

It is also known to provide a profile casting of material around at least three sides of a belt construction so that such casting can be subsequently utilized in an optical comparator to check the angle of the side surfaces of the belt construction.

For example, see the following U.S. patent: (1) U.S. Pat. No. 3,240,465—Henderson

SUMMARY OF THE INVENTION

It is one feature of this invention to provide an improved apparatus for measuring the angle of at least one side surface of an endless power transmission belt construction of the V-belt type wherein the belt construction has a top surface and a bottom surface with a pair of opposed non-parallel side surfaces therebetween.

In particular, it was found according to the teachings of this invention that the part of the apparatus that is pivotally mounted to pivot about its axis when being disposed against the adjacent side surface of the belt construction being measured could be made to be movable toward the belt construction in a direction substantially transverse to the pivot axis thereof when the belt construction is at its measuring position in the apparatus whereby accurate and repeatable measurement of the belt construction side angle could be provided.

For example, one embodiment of this invention provides an apparatus for measuring the angle of at least one side surface of an endless power transmission belt construction of the V-belt type wherein the belt construction has a top surface and a bottom surface with a pair of opposed non-parallel side surfaces therebetween, the apparatus having a first part against which the belt construction is adapted to be disposed in a belt construction measuring position thereof and having a second part pivotally mounted to pivot on an axis thereof and be adpated to be pivotally disposed against the one side surface to indicate the angle thereof by the relation of its pivoted position relative to a reference means when the belt construction is against the first part in the measuring position thereof, the apparatus having moving means operatively interconnected to the second part to tend to move the same towards the belt construction in a direction substantially transverse to the axis thereof when the belt construction is in the measuring position thereof.

Accordingly, it is an object of this invention to provide an improved apparatus for measuring the angle of at least one side surface of an endless power transmission belt construction of the V-belt type, the apparatus of this invention having one or more of the novel features of this invention as set forth above or hereinafter shown or described.

Another object of this invention is to provide an improved method for measuring the angle of at least one side surface of an endless power transmission belt construction of the V-belt type, the method of this invention having one or more of the novel features of this invention as set forth above or hereinafter shown or described.

Another object of this invention is to provide an improved method of making an apparatus for measuring the angle of at least one side surface of an endless power transmission belt construction of the V-belt type, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 4 is a view similar to FIG. 1 and illustrates the apparatus in an open condition thereof before the apparatus has received a belt construction to be measured thereby.

FIG. 5 is a schematic side view of a portion of the apparatus of FIG. 1 and illustrates the same as a V-belt construction is being initially inserted therein.

FIG. 6 is a view similar to FIG. 5 and illustrates the V-belt construction disposed in its final measuring position in the apparatus of FIG. 1.

DESCRIPTION OF THE PREFERRED EMBODIMENT

Figure 1:
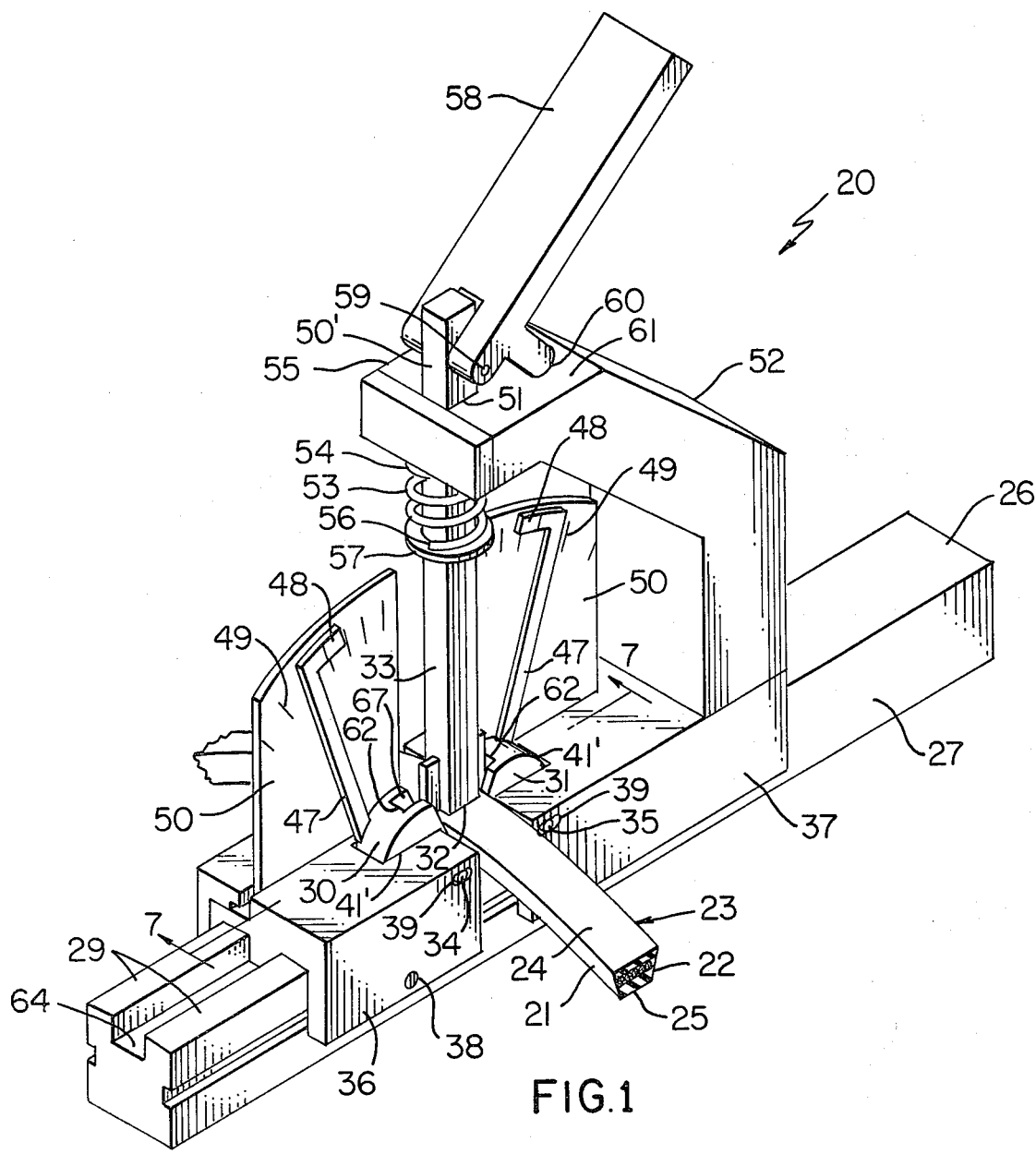
FIG. 1 is a top perspective view of the improved apparatus of this invention for measuring the angle of at least one side surface of an endless power transmission belt construction of the V-belt type.

While the various features of this invention are hereinafter set forth as being particularly adapted to provide an apparatus for measuring the angle of at least one side surface of an endless power transmission belt construction of the V-belt type, it is to be understood that the various features of this invention can be utilized singly or in various combinations thereof to provide an apparatus for measuring an angle of other structure as desired.

Therefore, this invention is not to be limited to only the embodiment illustrated in the drawings, because the drawings are merely utilized to illustrate one of the wide variety of uses of this invention.

Referring now to FIG. 1, the improved method and apparatus of this invention for measuring the angle of at least one side surface of an endless power transmission belt construction of the V-belt type is generally indicated by the reference numeral 20 and is shown measuring the angle of the opposed side surfaces 21 and 22 of an endless power transmission belt construction 23 of a V-belt type wherein the belt construction 23 has a top surface 24 and a bottom surface 25 with the pair of opposed non-parallel side surfaces 21 and 22 disposed therebetween whereby the belt construction 23 has a generally trapezoidal cross-sectional configuration as is conventional in the art.

Figures 2, 3:
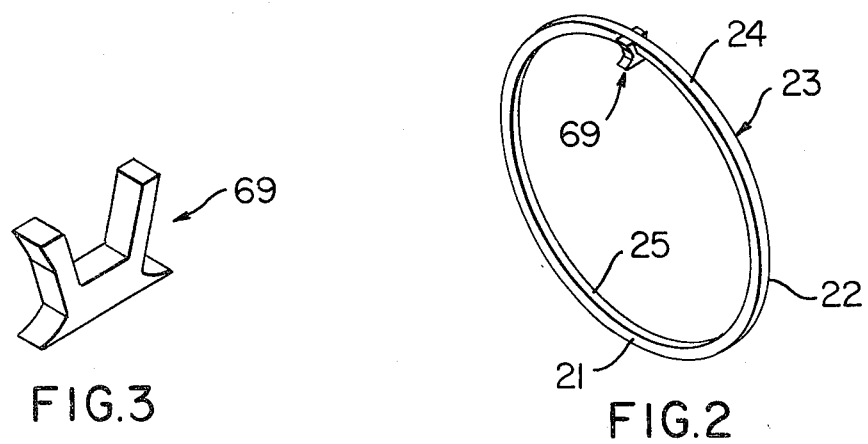
FIG. 2 is a reduced perspective view illustrating the V-belt construction being measured by the apparatus of FIG. 1 together with a profile casting that can be made by the apparatus of FIG. 1.
FIG. 3 is an enlarged perspective view of the profile casting of FIG. 2.
Figure 9:
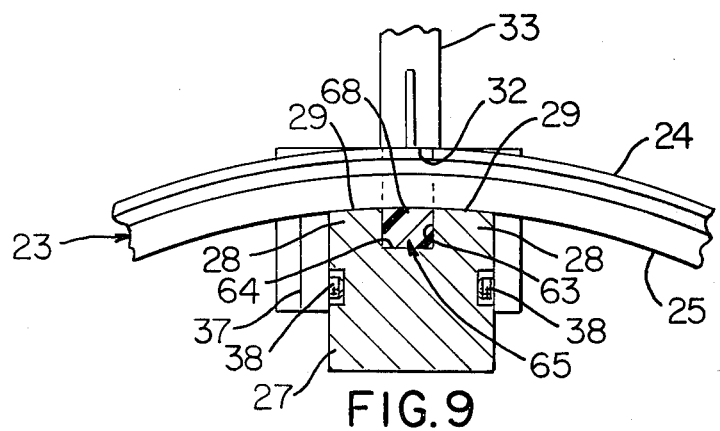
FIG. 9 is a fragmentary cross-sectional view taken on line 9—9 of FIG. 7.

The apparatus 20 comprises a frame means 26 having a first part 27 against which the bottom surface 25 of the belt construction 23 is adapted to be disposed, the first part 27 comprising a pair of spaced parallel rail-like members 28 that are illustrated as being integral and one-piece with the frame means 26 and respectively having arcuate top surfaces 29 as illustrated in FIG. 9 so as to substantially conform to the arcuate contour of the bottom surface 25 of the belt construction 23 when it is disposed in its natural annular configuration as illustrated in FIG. 2 and disposed in the apparatus 20 in a manner hereinafter set forth.

The apparatus 20 has a second part 30 and a third part 31 substantially identical to the second part 30, the parts 30 and 31 being adapted to respectively measure the angles of the side surfaces 21 and 22 of the belt construction 23 when the belt construction 23 is disposed in a belt measuring position thereof in the apparatus 20 wherein the belt construction 23 has its bottom surface 25 disposed against the arcuate surfaces 29 of the rail-like members 28, is transverse to the rail-like members 28 and is disposed directly beneath the bottom holding surface 32 of a movable holding member 33 that engages against the top surface 24 of the belt construction 23 as illustrated in FIGS. 1 and 9 and holds the bottom surface 25 of the belt construction against the rail-like members 28.

The parts 30 and 31 are respectively pivotally mounted by pivot pins 34 and 35 to adjustable blocks 36 and 37 carried by the frame means 26 in a manner to be adapted to be slideable thereon and fixed in a selected positions by set screws 38 or the like as will be apparent hereinafter.

In particular, each block 36 and 37 has an elongated slot means 39 provided therein wherein the opposed ends 40 and 41 of the respective pivot pin 34 or 35 are adapted to move in a direction substantially transverse to the pivot axis of the respective pin 34 or 35 so that its respective part 30 or 31 is adapted to move in a direction toward and away from the belt construction 23 in a direction that is substantially transverse to its pivot axis of its respective pivot pin 34 or 35 as will be apparent hereinafter. Of course each slot means 39 also permits its respective pivot pin 34 or 35 to rotate therein and thus have its respective part 30 or 31 rotate relative to its respective block 36 or 37.

Figure 7:
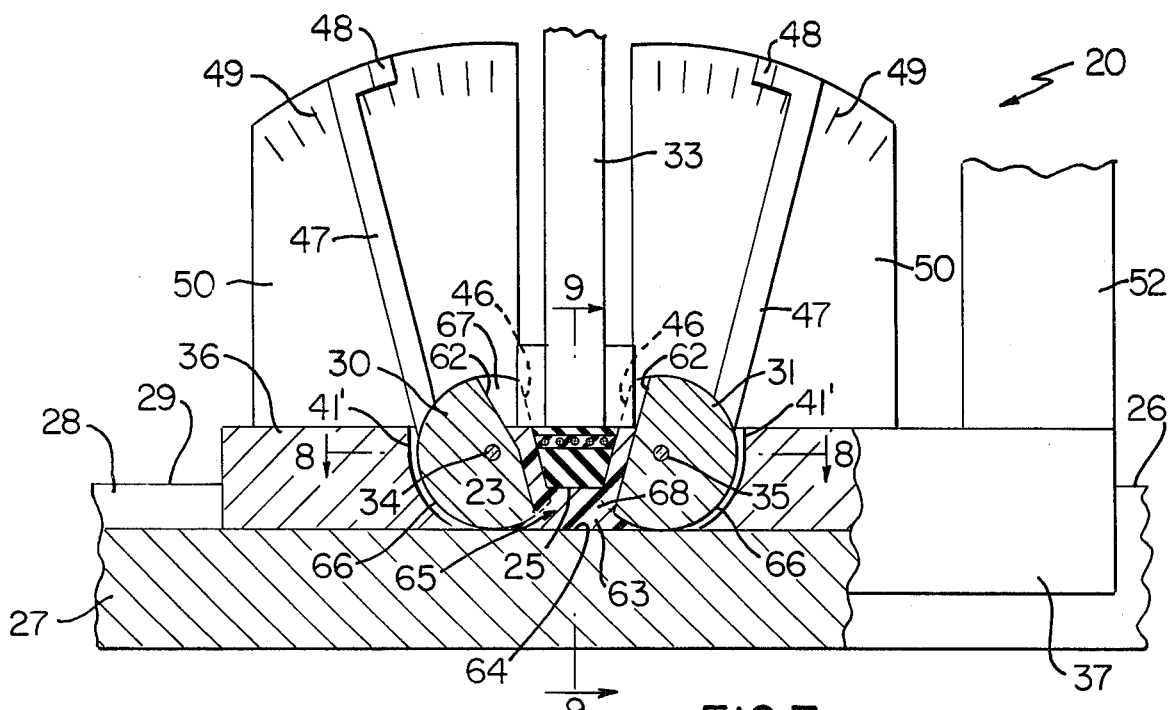
FIG. 7 is an enlarged fragmentary cross-sectional view taken substantially on line 7—7 of FIG. 1.
Figure 8:
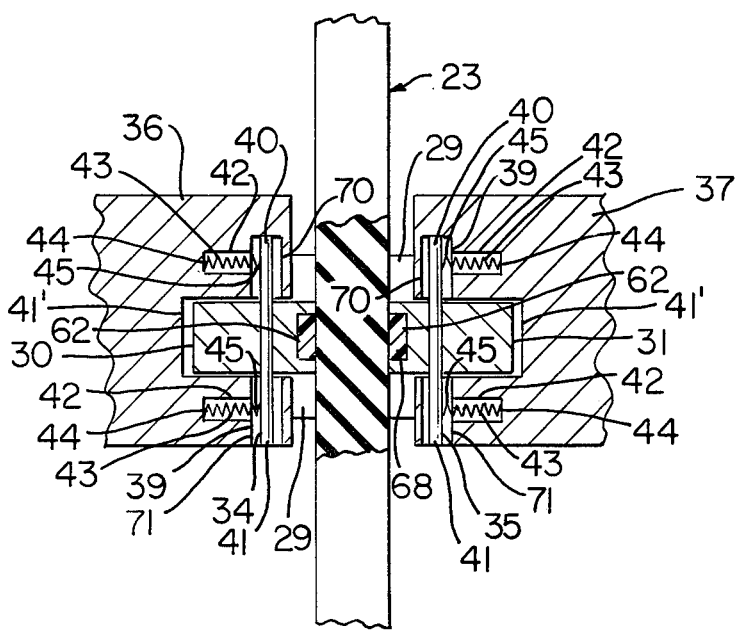
FIG. 8 is a fragmentary cross-sectional view taken on line 8—8 of FIG. 7.

Each part 30 and 31 is disposed in a cutout 41' in its respective block 36 or 37 to permit the aforementioned transverse movement within the limits of the elongated slot 39 as well as the aforementioned rotational movement. Each block 36 and 37 has a plurality of cavities 42 therein that intersect with the elongated slot 39 thereof and each contains a compression spring 43 which has one end 44 thereof that acts against the respective block 36 or 37 and another end 45 thereof that acts against the end 40 or 41 of the respective pivot pin 34 or 35 as illustrated in FIG. 8 so that the force of the compression springs 43 always tend to move the parts 30 and 31 in a direction transverse to their respective pivot axes of the pivot pins 34 and 35 toward each other and, thus, toward the belt construction 23 when the same is disposed in the measuring position thereof as illustrated in FIGS. 1, 7, 8 and 9 for a purpose hereinafter described.

Each part 30 and 31 has a flat surface 46 that is adapted to engage against the respective angled side surface 21 or 22 of the belt construction 23 throughout substantially the entire length thereof as illustrated in FIG. 6 so that the particular member 30 or 31 is in a particular pivoted position through its respective pivot pin 34 or 35 in its respective block 36 and 37 so that the same can indicate its pivoted position in relation to the angle of the side surface 21 or 22 of the belt construction 23.

In particular, each part 30 and 31 has an indicating arm 47 secured thereto and extending outwardly therefrom to define an indicating end 48 thereof that indicates the angle being measured by the particular member 30 or 31 in relation to the end 48 being disposed adjacent a scale 49 on a member 50 carried by the respective block 36 or 37 as illustrated. Thus, the scale 49 will correctly indicate the angle that the particular member 30 or 31 is pivoted to when the same has its surface 46 disposed flush against the respective side surface 21 or 22 of the belt construction 23 as illustrated in FIGS. 6 and 7 whereby an operator can determine the exact angles of the side surfaces 21 and 22 of the belt construction 23 in order to make sure that the same conform to the desired angles for a production run of belt constructions 23 as is well known in the belt making art.

The hold down member 33 of the apparatus 20 has its upper end 50' loosely passing through an opening 51 in a bracket-like arm 52 of the slide block 37 so as to positively position the lower end 32 of the holding member 33 in such a manner that the same will be directly over the belt measuring position for the belt construction 23 as will be apparent hereinafter.

The holding member 33 is urged downwardly toward the rails 28 of the frame means 26 by a compression spring 53 telescoped on the member 33 and having one end 54 bearing against the outer flange-like part 55 of the arm 52 and a lower end 56 bearing against a spring retainer 57 carried by the holding member 33 in any suitable manner whereby the force of the compression spring 53 urges the holding member 33 downwardly against the top surface 24 of the belt construction 23 for the purpose hereinafter set forth.

In order to raise the holding member 33 to permit the belt construction 23 to be removed from the apparatus 20 and another belt construction 23 to be placed therein, a suitable camming handle 58 is pivotally mounted to the end 50' of the holding member 33 by a pivot pin 59 so that a cam extension 60 of the handle 58 can act against the top surface 61 of the flange-like part 55 of the arm 52 of the block 37 when the handle 58 is moved in a clockwise direction in FIG. 1 as illustrated in FIG. 5. In this manner, the cam member 60 causes the handle 58 to pull upwardly on the holding member 33 in opposition to the force of the compression spring 53 to raise the lower end 32 of the holding member 33 upwardly so that the belt construction 23 can be removed from the apparatus 20 and a new belt construction can be disposed therein, such belt removing and belt replacing operation requiring the slide block 36 to be moved from its measuring position as illustrated in FIG. 1 to its open position as illustrated in FIG. 4 by the loosening of the set screw means 38 and the sliding of the block 36 away from the block 37 as illustrated in FIG. 4. However, once a new belt construction 23 has been placed in the apparatus 20 adjacent the belt measuring position at the rails 28 as hereinafter described, the block 36 can be moved back to the position illustrated in FIG. 1 and the set screw means 38 can be tightened to hold the block 36 in such belt measuring position as will be apparent hereinafter.

Therefore, it can be seen that the movable members 30 and 31 are being utilized to measure the angles of the side surfaces 21 and 22 of a belt construction 23 and indicate such angles by the cooperation of the arm ends 48 with the scales 49 whereby an operator can accurately read the measured angles of the side surfaces 21 and 22 of a belt construction 23 by utilizing the apparatus 20 of this invention by the method of this invention as hereinafter set forth.

However, while the parts 30 and 31 of this invention can be utilized to cooperate with the frame means 26 of the apparatus 20 to permit a profile casting to be made of the belt construction 23 at the same time that the parts 30 and 31 are measuring the angles of the side surfaces 21 and 22, such profile casting feature does not form part of this invention but will now be described.

It can be seen in FIGS. 7 and 8 that each part 30 and 31 has the measuring surface 46 thereof medially interrupted throughout its entire length by a recess 62 that communicates with a space 63 between the rail-like members 28 and a bottom surface 64 of the frame 26 to provide a cavity that substantially surrounds a portion of the sides 21 and 22 of the belt construction 23 as well as part of the bottom surface 25 thereof, the cavity being generally indicated by the reference numeral 65 in FIG. 9.

In order to close off the cavity 65 between the parts 30 and 31, each part 30 and 31 has an outer peripheral cylindrical surface 66 that joins with the flat surface 46 thereof, the peripheral cylindrical surface 66 being substantially concentric with its respective pivot pin 34 or 35.

The slots 39 in the slide block 36 and 37 are so arranged that the parts 30 and 31 when rotating relative to their respective block 36 and 37 have the peripheral surface 66 thereof disposed closely adjacent the surface 64 of the frame means 26 to close off the cavity 65 from the remaining space between the rail-like members 28 outboard of the parts 30 and 31 as illustrated in FIG. 7, the parts 30 and 31 being between the rail-like members 28 and being disposed closely adjacent the facing sides of the rail-like members 28 while still being movable relative thereto.

In this manner, when the belt construction 23 is disposed in the belt construction measuring position illustrated in FIG. 7 and the parts 30 and 31 are measuring the angles of the side surfaces 21 and 22 of the belt construction 23 by having the flat surfaces 46 thereof disposed against the surfaces 21 and 22 as illustrated in FIGS. 6 and 7 in a manner hereinafter set forth, suitable liquid mold material can be poured into the cavity 65 through an enlarged portion 67 of the recess 62 formed in the upper portion of the part 30 to fill the cavity 65 at least to the level of the top surface 24 of the belt construction 23 as illustrated in FIG. 7 so that subsequently the mold material 68 will solidify and thereby provide a profile element or casting that is generally indicated by the reference numeral 69 in FIGS. 2 and 3 to be utilized for optical comparison testing in much the same manner as set forth in the aforementioned U.S. Pat. No. 3,240,465 which patent is being incorporated into this disclosure by this reference thereto in order to provide details of the material for the casting 69 and the use thereof.

However, it is to be understood that the apparatus 20 can be utilized without making the profile casting 69, if desired.

Therefore, it can be seen that the apparatus 20 of this invention can be made by the method of this invention from a relatively few parts in a relatively simple manner to operate in a manner now to be described.

When it is desired to utilize the apparatus 20 of this invention for measuring the angles of the side surfaces 21 and 22 of a belt construction 23, the apparatus 20 is opened in the manner illustrated in FIG. 4 wherein the block 36 has the set screw means 38 thereof loosened so that the block 36 can be moved away from the block 37 as illustrated. Also, the handle 58 is moved in a clockwise direction to pull the holding member 33 vertically upwardly as illustrated whereby the apparatus 20 is now in an open condition thereof. An endless power transmission belt 23 in the annular configuration illustrated in FIG. 2 is slipped over the left hand end of the apparatus 20 in FIG. 4 and passes over the left hand scale part 50 in a telescoping manner so that the belt construction 23 can have a part thereof disposed beneath the holding member 33 and be manually held above the top surfaces 29 of the rails 28 so that the block 36 can be moved back toward the block 37 to position its part 30 in the manner illustrated in FIG. 5 wherein the compression springs 43 are holding the pivot pins 34 and 35 of the respective parts 30 and 31 against the outer surfaces 70 of the slots 90 as illustrated in FIG. 5. As illustrated in FIG. 5, the opposed corners of the bottom surface 25 of the belt construction 23 are engaging against the surfaces 46 of the members 30 and 31 and the bottom surface 25 of the belt construction 23 is spaced above the top surfaces 29 of the rails 28.

However, when the operator moves the handle 58 of the holding member 33 upwardly in a counterclockwise direction to permit the compression spring 53 to move the holding member 33 downwardly so that the end 32 thereof compresses against the top surface 24 of the belt construction 23 and forces the belt construction downwardly between the parts 30 and 31, the parts 30 and 31 not only pivot on their axes 34 and 35 so as to have the surfaces 46 thereof respectively align with the side surfaces 21 and 22 of the belt construction 23 as illustrated in FIG. 6, but also the parts 30 and 31 move transversely away from the belt construction 23 to permit the belt construction 23 to be wedged downwardly therebetween to place the bottom surface 25 thereof against the top surfaces 29 of the rail-like members 28 as illustrated in FIG. 6. Such outward movement of the parts 30 and 31 is permitted by the elongated slots 39 in the blocks 36 and 37 as illustrated in FIG. 8 wherein the members 34 and 35 are still spaced from the inner surfaces 71 of the slots 39 when the belt construction 23 is in its belt measuring position whereby the spring force of the springs 43 maintain the surfaces 46 of the parts 30 and 31 in full contact with the side surfaces 21 and 22 of the belt construction 23 while the belt construction 23 is being held in its belt measuring position by the holding member 33 as illustrated in FIGS. 6 and 7.

When the belt construction 23 has been moved to the belt measuring position by the holding member 33 as illustrated in FIGS. 6 and 7, it can be seen that the parts 30 and 31 have been pivoted in such a manner that the arms 47 thereof indicate on the scales 49 the exact angles being measured by the parts 30 and 31 so that the operator of the apparatus 20 can determine whether or not the belt construction 23 has its sides 21 and 22 formed at the proper angles in order to make sure that the process producing like belt constructions 23 in a production run thereof is being operated properly to form the belt constructions 23 with the proper angles on the side surfaces 21 and 22 for the reasons well known in the belt construction art.

After measuring the belt construction 23 in the above manner, the belt construction 23 is removed from the apparatus 20 by moving the block 36 away from the block 37 and moving the holding member 33 upwardly as previously described so that belt construction 23 can be slipped off the left hand end of the frame 26. Thus, the apparatus 20 is now ready to measure another belt construction in the above manner.

Therefore, it can be seen that this invention not only provides an improved method and apparatus for measuring the angle of at least one side surface of an endless power transmission belt construction of the V-belt type, but also this invention provides an improved method for making such apparatus.

While the form and methods of this invention now preferred have been illustrated and described as required by the Patent Statute, it is to be understood that other forms and method steps can be utilized and still fall within the scope of the appended claims.

What is claimed is:

1. In an apparatus for measuring the angle of at least one side surface of an endless power transmission belt construction of the V-belt type wherein said belt construction has a top surface and a bottom surface with a pair of opposed non-parallel side surfaces therebetween, said apparatus having a first part against which said belt construction is adapted to be disposed in a belt construction measuring position thereof and having a second part pivotally mounted to pivot on an axis thereof and being adapted to be pivotally disposed against said one side surface to indicate the angle thereof by the relation of its pivoted position relative to a reference means when said belt construction is against said first part in said measuring position thereof, the improvement wherein said apparatus has moving means operatively interconnected to said second part to tend to move the same toward said belt construction in a direction substantially transverse to said axis thereof when said belt construction is in said measuring position thereof, a moveable holding member adapted to engage said belt construction to hold said belt construction when in said measuring position thereof, and means operatively interconnected to said holding means for tending to move said holding member in a direction toward said belt construction when said belt construction is in said measuring position thereof.

2. An apparatus as set forth in claim 1 wherein said means for tending to move holding member comprises a biasing means.

3. An apparatus as set forth in claim 2 wherein said biasing means comprises a compression spring.

4. In a method of making an apparatus for measuring the angle of at least one side surface of an endless power transmission belt construction of the V-belt type wherein said belt construction has a top surface and a bottom surface with a pair of opposed non-parallel side surfaces therebetween, said method comprising the steps of forming a first part of said apparatus against which said belt construction is adapted to be disposed in a belt construction measuring position thereof, and pivotally mounting a second part on said apparatus to pivot on an axis thereof and be adapted to be pivotally disposed against said one side surface to indicate the angle thereof by the relation of its pivoted position relative to a reference means when said belt construction is against said first part in said measuring position thereof, the improvement comprising the steps of operatively interconnecting moving means to said second part to tend to move the same toward said belt construction in a direction substantially transverse to said axis thereof when said belt construction is in said measuring position thereof, forming said holding member to be adapted to engage said belt construction to hold said belt construction in said measuring position, and operatively interconnecting means to said holding means to tend to move said holding member in a direction toward said belt construction when said belt construction is in said measuring position thereof.

5. A method as set forth in claim 7 and including the step of forming said moving means to comprise a biasing means.

6. A method as set forth in claim 5 and including the step of forming said biasing means to comprise a compression spring.

7. A method as set forth in claim 4 and including the steps of forming said apparatus to have a frame means, and slidably mounting said second part on said frame means so as to be movable toward and away from said belt construction in said direction that is transverse to said axis when said belt construction is in said measuring position thereof.

8. A method as set forth in claim 4 and including the step of disposing a movable holding member on said apparatus for holding said belt construction in said measuring position thereof.

9. A method as set forth in claim 4 and including the step of forming said means for tending to move said holding member to comprise a biasing means.

10. A method as set forth in claim 9 and including the step of forming said biasing means to comprise a compression spring.

11. A method as set forth in claim 4 and including the steps of forming said apparatus to have a frame means, forming said first part to be carried by said frame means and comprise a pair of spaced parallel rail-like members, and disposing said second part to be movable between said rail-like members.

12. A method as set forth in claim 11 and including the step of forming a movable holding member for holding said belt construction with its said bottom surface against said rail-like members and with said belt construction transverse to said rail-like members.

13. A method as set forth in claim 12 and including the step of forming said holding member to be adapted to engage said top surface of said belt construction to hold said belt construction in said belt construction measuring position thereof.

14. A method as set forth in claim 4 and including the steps of forming said second part to have an arm extending therefrom, and disposing a scale adjacent said arm whereby the position of said arm relative to said scale indicates the angle of said one side surface of said belt construction when said belt construction is in said measuring position thereof.

15. A method as set forth in claim 4 and including the steps of pivotally mounting a third part on said apparatus to pivot on an axis thereof and be adapted to be pivotally disposed against the other side surface of said belt construction when said belt construction is in said measuring position thereof to indicate the angle thereof by the relation of its pivoted position relative to a reference means, and operatively interconnecting moving means to said third part to tend to move the same toward said belt construction in a direction substantially transverse to said axis thereof when said belt construction is in said measuring position thereof.

16. A method as set forth in claim 15 and including the steps of forming said moving means for said second part and said third part to each comprise a compression spring whereby said springs urge said second and third parts toward each other, and forming means on said apparatus for forcing said belt construction between said second and third parts to hold said belt construction against said first part whereby said belt construction in said measuring position thereof will move said second and third part transversely away from said belt construction and cause said second and third parts to pivot on said axes thereof to conform respectively to said side surfaces thereof and thereby indicate the angles thereof.

17. In an apparatus for measuring the angle of at least one side surface of an endless power transmission belt construction of the V-belt type wherein said belt construction has a top surface and a bottom surface with a pair of opposed non-parallel side surfaces therebetween, said apparatus having a first part against which said belt construction is adapted to be disposed in a belt construction measuring position thereof and having a second part pivotally mounted to pivot on an axis thereof and being adapted to be pivotally disposed against said one side surface to indicate the angle thereof by the relation of its pivoted position relative to a reference means when said belt construction is against said first part in said measuring position thereof, the improvement wherein said apparatus has a holding member adapted to engage said belt construction to hold said belt construction when in said measuring position thereof and means operatively interconnected to said holding means for tending to move said holding member in a direction toward said belt construction when said belt construction is in said measuring position.

18. An apparatus as set forth in claim 17 wherein said moving means comprises a biasing means.

19. An apparatus as set forth in claim 17 wherein said biasing means comprises a compression spring.

20. An apparatus as set forth in claim 17 wherein said apparatus has a frame means, said second part being slidable mounted on said frame means so as to be movable toward and away from said belt construction in said direction that is transverse to said axis when said belt construction is in said measuring position thereof.

21. An apparatus as set forth in claim 17 wherein said apparatus has a frame means, said first part being carried by said frame means and comprising a pair of spaced parallel rail-like members, said second part being movable between said rail-like members.

22. An apparatus as set forth in claim 21 and including a movable holding member for holding said belt construction with its said bottom surface against said rail-like members and with said belt construction transverse to said rail-like members.

23. An apparatus as set forth in claim 22 wherein said holding member is adapted to engage said top surface of said belt construction to hold said belt construction in said belt construction measuring position thereof.

24. An apparatus as set forth in claim 17 wherein said second part has an arm extending therefrom, said apparatus having a scale disposed adjacent said arm whereby the position of said arm relative to said scale indicates the angle of said one side surface of said belt construction when said belt construction is in said measuring position thereof.

25. An apparatus as set forth in claim 17 and including a third part pivotally mounted to pivot on an axis thereof and being adapted to be pivotally disposed against the other side surface of said belt construction when said belt construction is in said measuring position thereof to indicate the angle thereof by the relation of its pivoted position relative to a reference means, said apparatus having moving means operatively interconnected to said third part to tend to move the same toward said belt construction in a direction substantially transverse to said axis thereof when said belt construction is in said measuring position thereof.

26. An apparatus as set forth in claim 25 wherein said moving means for said second part and said third part each comprises a compression spring whereby said springs urge said second and third parts toward each other, said apparatus having means for forcing said belt construction between said second and third parts to hold said belt construction against said first part whereby said belt construction in said measuring position thereof moves said second and third part transversely away from said belt construction and cause said second and third parts to pivot on said axes thereof to conform respectively to said side surfaces thereof and thereby indicate the angles thereof.

27. In a method of operating an apparatus for measuring the angle of at least one side surface of an endless power transmission belt construction of the V-belt type wherein said belt construction has a top surface and a bottom surface with a pair of opposed non-parallel side surfaces therebetween, said method comprising the steps of disposing said belt construction against a first part of said measuring apparatus so that said belt construction is disposed in a belt construction measuring position thereof, and pivoting a second part of said apparatus on an axis thereof so as to be pivotally disposed against said one side surface to indicate the angle thereof by the relation of its pivoted position relative to a reference when said belt construction is against said first part in said measuring position thereof, the improvement comprising the step of forcing said second part away from said belt construction in a direction substantially transverse to said axis thereof in opposition to spring means action on said second part by moving said belt construction into said measuring position thereof whereby said second part pivots on said axis thereof to conform to said one side surface of said belt construction and thereby indicate the angle thereof.

28. A method as set forth in claim 27 wherein said step of forcing said belt construction comprises the step of moving said belt construction to said measuring position thereof so that said bottom surface thereof engages said first part of said apparatus.

29. A method as set forth in claim 28 wherein said step of forcing said belt construction comprises the step of moving said belt construction to said measuring position thereof with a holding member of said apparatus that engages against said top surface of said belt construction.

30. A method as set forth in claim 29 and including the step of holding said belt construction in said measuring position thereof with said holding means under the force of a compression spring of said apparatus.

31. A method as set forth in claim 27 wherein said step of forcing said belt construction causes a third part of said apparatus to be forced away from said belt construction in a direction substantially transverse to a pivot axis thereof in opposition to spring means acting on said third part whereby said third part pivots on said axis thereof to conform to the other side surface of said belt construction and thereby indicate the angle thereof when said belt construction is in said measuring position thereof.

* * * * *